United States Patent
Bodapati et al.

(10) Patent No.: US 8,854,190 B2
(45) Date of Patent: Oct. 7, 2014

(54) SYSTEMS AND METHODS TO DETECT CROSS READS IN RFID TAGS

(75) Inventors: Sujatha Bodapati, Saratoga, CA (US);
Ritesh K. Rajani, Chennai (IN);
Nagarajan Ramanathan, Chennai (IN)

(73) Assignee: AssetPulse, LLC, San Jose, CA (US)

( * ) Notice: Subject to any disclaimer, the term of this patent is extended or adjusted under 35 U.S.C. 154(b) by 228 days.

(21) Appl. No.: 12/978,519

(22) Filed: Dec. 24, 2010

(65) Prior Publication Data

US 2012/0161968 A1   Jun. 28, 2012

(51) Int. Cl.
*H04Q 5/22* (2006.01)
*G08B 13/14* (2006.01)

(52) U.S. Cl.
USPC ............... 340/10.2; 340/10.32; 340/10.41; 340/572.1; 340/572.4

(58) Field of Classification Search
USPC ...................................... 340/572.1
See application file for complete search history.

(56) References Cited

U.S. PATENT DOCUMENTS

| | | | | |
|---|---|---|---|---|
| 6,972,682 | B2* | 12/2005 | Lareau et al. | 340/568.1 |
| 8,294,554 | B2* | 10/2012 | Shoarinejad et al. | 340/10.1 |
| 2006/0202032 | A1* | 9/2006 | Kricorissian | 235/435 |
| 2007/0143162 | A1* | 6/2007 | Keever et al. | 705/7 |
| 2010/0182128 | A1* | 7/2010 | Kim et al. | 340/10.2 |
| 2012/0161967 | A1* | 6/2012 | Stern | 340/572.1 |

* cited by examiner

*Primary Examiner* — Jennifer Mehmood
*Assistant Examiner* — John Mortell

(57) ABSTRACT

Systems and methods to detect cross reads in RFID tags are disclosed. Existing RFID reading mechanisms do not have the provision of detecting cross reads and eliminating the cross reads while performing inventory of an area. As a result, the user will have to manually determine the cross reads from the data and eliminate them. The disclosed method employs a RFID reader that is equipped with a plurality of engines for performing scan on the inventories. The scanned data is processed by a processing unit. In the processing unit, normalization is performed on the scanned data, neighboring assets and spatial location maps are created. The data from the above processes is employed for detecting cross reads during the scan. The identified cross reads are eliminated based on various other parameters obtained by analyzing scanned data.

20 Claims, 16 Drawing Sheets

SYSTEMS AND METHODS TO DETECT CROSS READS IN RFID TAGS

TECHNICAL FIELD

The embodiments herein relate to radio frequency identification (RFID) technology, and more particularly to detection of cross reads in RFID readers.

BACKGROUND

Radio Frequency Identification (RFID) means are widely employed in present day systems. The biggest advantage of the RFID technology is that they are capable of reading RF tags from a long distance without requiring line of sight. The RF signals can penetrate through solid objects such as wood, glass, concrete and almost everything except metals and liquids. This feature of RF signals enables the use of RFID readers for reading assets through cabinets, racks and packaging materials. The penetration feature of RFID over a long range makes the inventory process quicker and more efficient.

RFID readers are available in different forms today such as fixed readers, mobile readers, vehicle mount readers and so on. Most commonly used forms are fixed readers and mobile readers. Fixed readers have a fixed position and are located close to the inventory to be scanned. Fixed readers are employed for reading one or more inventories that are located close to each other. On the other hand, mobile readers are movable and may be carried to any desired location for performing the scan. Using a mobile reader it is possible to scan all the inventories that are located in a particular area of interest.

However, the RFID readers have their own limitations. The range of RFID readers cannot be limited to within a particular area of interest. For example, when performing inventory of a building, the user may employ mobile RFID reader. Using the RFID reader the user may scan and record the assets that are present in each room. All the RFID tags that are scanned in the room become associated with the room number where the user performed the scan. However, as the RFID reader can read through the wall, there is every possibility that the reader records assets from an area that is close to the room. The tags that are read from adjacent rooms are referred to as cross reads. Due to cross reads, a user will not have an accurate account of the assets or inventory in a desired location. Further, since it is difficult to have an account, it becomes even more difficult to keep track of assets moving in and out of an area.

The challenge in detecting cross reads using a single mobile RFID reader is taking into account the randomness of performing every scan. The user walks with the mobile RFID reader and waves the reader in the direction of assets to scan them. In every scan, the user might have scanned assets from different positions and from different angles, meaning that the read parameters (signal strength, read count) are randomly changing in every scan. Also, the fact that the physical position of the assets might have changed between scans makes it even more difficult to determine if an asset is physically present in the current location (normal read) or in a nearby location (cross read).

Present day mechanisms employ some methods for reducing cross reads. One of the solutions is to employ a metal barrier to prevent the RFID reader from reading beyond the designated boundary. The walls may be lined with aluminium sheets to create a zone such that the RF radiations cannot penetrate in this zone. However, one cannot guarantee that the protection will be effective. There is also the possibility of RF radiations still penetrating the metal barrier, depending on the efficacy of the barrier. More importantly, this will add to the overall cost as a major change in the infrastructure is required to install such barriers.

In another solution, the power of the RFID reader is reduced. This method only reduces the sensitivity and range of operation of the reader. But the method does not confine a read to a designated area. This means that the user could still get cross reads even after reducing the power. Further, reducing the sensitivity would lead to inefficient performance of the RFID readers and the user will have to move closer to the tags in order to perform a scan. This negates the advantage of using RFID readers.

Further, in some systems, which do not reduce or detect the cross reads, users are expected to manually identify cross read items and correct the inaccuracies in the cross reads. This process would be time consuming and cumbersome.

SUMMARY

In view of the foregoing, an embodiment herein provides a mechanism for identifying cross reads in RFID readers comprising of RFID reader which is characterized in that for obtaining information on a plurality of parameters from a plurality of RFID tags in the facility, normalizing the obtained parameter information for each detected RFID tag at every location scanned, formulating virtualized sets of neighboring assets and formulating spatial location maps of neighboring locations.

Embodiments further disclose an RFID reader for identifying an RFID tag that is cross read in a location of a facility. The reader comprising means for obtaining information on a plurality of parameters from a plurality of RFID tags in the facility, a normalizing engine adapted for normalizing the obtained parameter information for each detected RFID tag at every location scanned, an asset engine adapted for formulating virtualized sets of neighboring assets, a location engine adapted for formulating spatial location maps of neighboring locations and a cross read identification engine that is adapted for performing analysis and categorizing cross reads.

Also, disclosed herein is a method of identifying an RFID tag that is cross read in a location of a facility using a single mobile RFID reader. The method comprising obtaining information on a plurality of parameters from a plurality of RFID tags in said facility, normalizing the obtained parameter information for each detected RFID tag at every location scanned, formulating virtualized sets of neighboring assets and formulating spatial location maps of neighboring locations.

Also, disclosed herein is a method for forming asset sets in order to identify cross reads in RFID reader. The method comprising steps of fetching normalized parameters of assets from scanned asset data, identifying asset sets that are scanned in same time slices, grouping the asset sets that are scanned in same time slices, identifying neighboring asset sets from the grouped asset sets and determining if an asset from the grouped asset set is cross read.

Also, disclosed herein is a method for creating spatial location maps in order to identify cross reads in RFID reader. The method comprising steps of fetching location information of assets from the scanned RFID tag information, identifying locations that are in proximity from the fetched location information and creating a map of locations based on the location information.

These and other aspects of the embodiments herein will be better appreciated and understood when considered in conjunction with the following description and the accompanying drawings.

BRIEF DESCRIPTION OF FIGURES

The embodiments are illustrated in the accompanying drawings, through out which like reference letters indicate corresponding parts in the various figures. The embodiments herein will be better understood from the following description with reference to the drawings, in which.

DETAILED DESCRIPTION OF EMBODIMENTS

Figure 1:
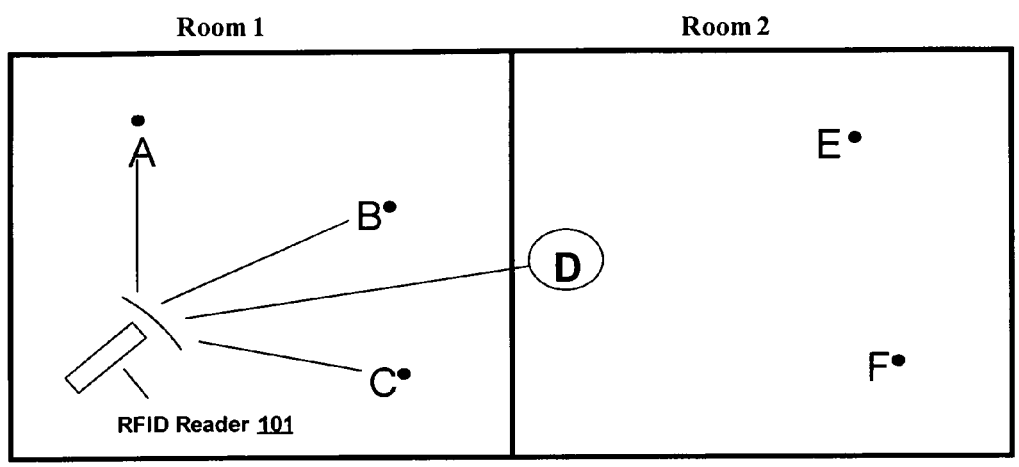
FIG. 1 illustrates existing RFID readers having the problem of cross reads, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a cross read detection and elimination mechanism by employing normalization, neighboring assets and spatial location mapping techniques. Referring now to the drawings, and more particularly to FIGS. 1 through 13, where similar reference characters denote corresponding features consistently throughout the figures, there are shown preferred embodiments.

An RFID system to track and list inventories within an area of interest is disclosed. The area of interest may be a rack, a cubicle, a room, a building, an office and the like. The system employs a method to effectively detect and eliminate cross reads that may occur during the inventory scan. The system herein comprises an RFID reader that is equipped with a plurality of engines for performing scan on the inventories. In an embodiment, the RFID reader is a mobile reader. A user may employ the RFID reader in order to scan the inventories in the area of interest. The inventories are provided with tags on them in order to enable the RFID reader to scan the inventory. On performing the scan, the data of the inventories such as tag ID, form of the tag, time of scan, asset type, and signal strength and so on are recorded in the RFID reader. The scanned data is processed by a processing unit. In the processing unit, normalization is performed on the scanned data. Further, spatial location maps are created employing the scanned data of the inventories. The data from the above processes is then employed for the purpose of detecting cross reads during the scan. The identified cross reads are then eliminated based on various other parameters obtained by analyzing scanned data.

FIG. 1 illustrates existing RFID readers having the problem of cross reads, according to embodiments as disclosed herein. Consider the scenario of Room 1 and Room 2 located close to each other. Room 1 comprises of inventories A, B and C. Room 2 comprises of inventories D, E and F. A user employs a mobile RFID reader 101 in order to track the inventories in Room 1. The RFID reader 101 is a hand held device using which the user can move to locations where the inventories are kept and perform a scan. User performs a scan of Room 1 where inventories present are A, B, and C. The user moves closer towards each of these inventories and scans them. The RFID reader 101 has its own range of operation and it scans every element which comes within its range of operation. When the user scans inventories in Room 1, the RFID reader 101 also records inventory D present in Room 2. Since Room 2 is very close to Room 1, while scanning Room 1, the reader also scans inventory D as it falls within the range of the RFID reader 101. At the end of the scan, the system records that the inventory D is located in Room 1. This is because the inventory D is cross read during the scan process. After a period of time, when the user wishes to locate inventory D, the user is directed by the system to Room 1. However, this is not the correct location of the inventory. In reality the inventory D is in Room 2 and the user will have to manually search for the inventory D. Due to such cross reads, the location of the inventories are inaccurate. This leads to an error while classifying the inventories based on the scanned data. Further, existing systems do not provide any mechanism to identify such cross reads and eliminate them.

Figure 2:
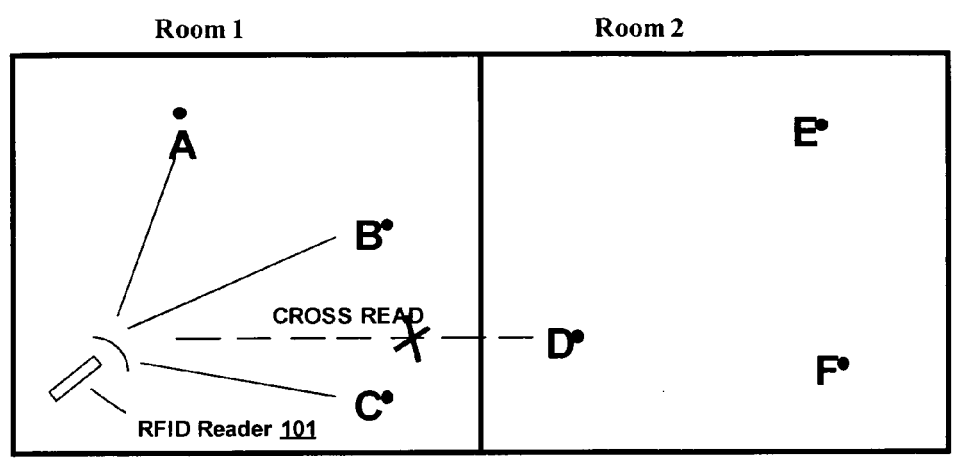
FIG. 2 illustrates proposed solution for preventing cross reads in RFID reader, according to embodiments as disclosed herein.

FIG. 2 illustrates proposed solution for preventing cross reads in RFID reader, according to embodiments as disclosed herein. The system comprises a mobile RFID reader 101. The user employs the RFID reader 101 in order to scan the inventories in Room 1. RFID reader 101 performs the scan on inventories A, B and C located in Room 1. While reading, the RFID reader 101 also records inventory D from Room 2. The scanned data is then sent to a processing unit within the RFID reader 101. The processing unit uses the raw scanned data and normalizes the data into a form that is suitable for further processing. The normalized data is then clustered into asset sets. Based on the data from the asset sets and the locations of the inventories a spatial location map is created. Further, location pair analysis is carried out in order to identify if there are any cross reads. In case, there are cross reads the cross reads are eliminated. In the considered scenario, the cross read inventory D that is read from Room 2 is identified. Further, by employing cross read filtering mechanisms the cross read inventory D is eliminated from the inventory list of Room 1. At a later stage, when the user wants to locate inventories in Room 1 he is provided with the list of inventories A, B and C. To locate inventory D the system directs the user to Room 2 which is the correct location of D. As a result, cross reads are eliminated from the list thereby producing more accurate results.

Figure 3:
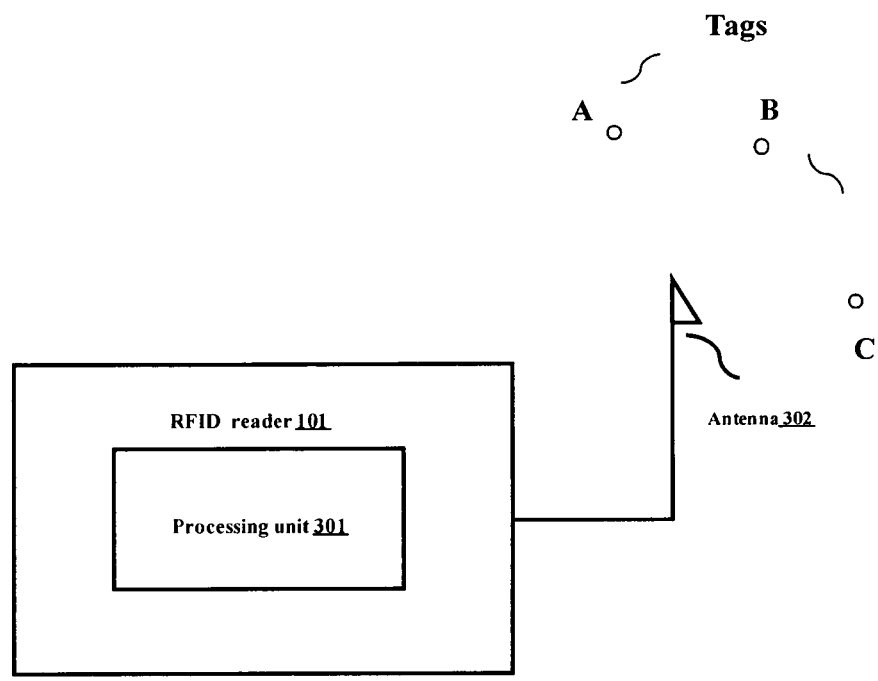
FIG. 3 illustrates a block diagram of RFID system, according to embodiments as disclosed herein.

FIG. 3 illustrates a general block diagram of the RFID system, according to embodiments as disclosed herein. The embodiments described herein may be applicable to RFID readers equipped with soft triggers as well. The RFID reader 101 is provided with an antenna 302. The RFID reader 101 comprises of a processing unit 301. In an embodiment, the processing unit may also be located outside the RFID reader 101. Inventories are provided with RFID tags on them in order to enable the RFID reader 101 to record the inventories during the scan. The RFID tags/transponders contain product based information encoded within them. The scan may be performed by pressing a trigger on the RFID reader 101. The RFID reader 101 which is also known as transceiver receives information sent by transponders using the antenna while performing a scan of the inventory. The scanned data is decoded to obtain information on the inventory. The information may include the time of scan, signal strength, type of inventory, read count and so on. The RFID tag could be either an active tag or a passive tag. The tag is said to be an active tag if the tag power source is internal to the tag in the form of a battery and a tag is said to be passive tag if the power source is energy transferred using Radio Frequency from the reader.

Figure 4:
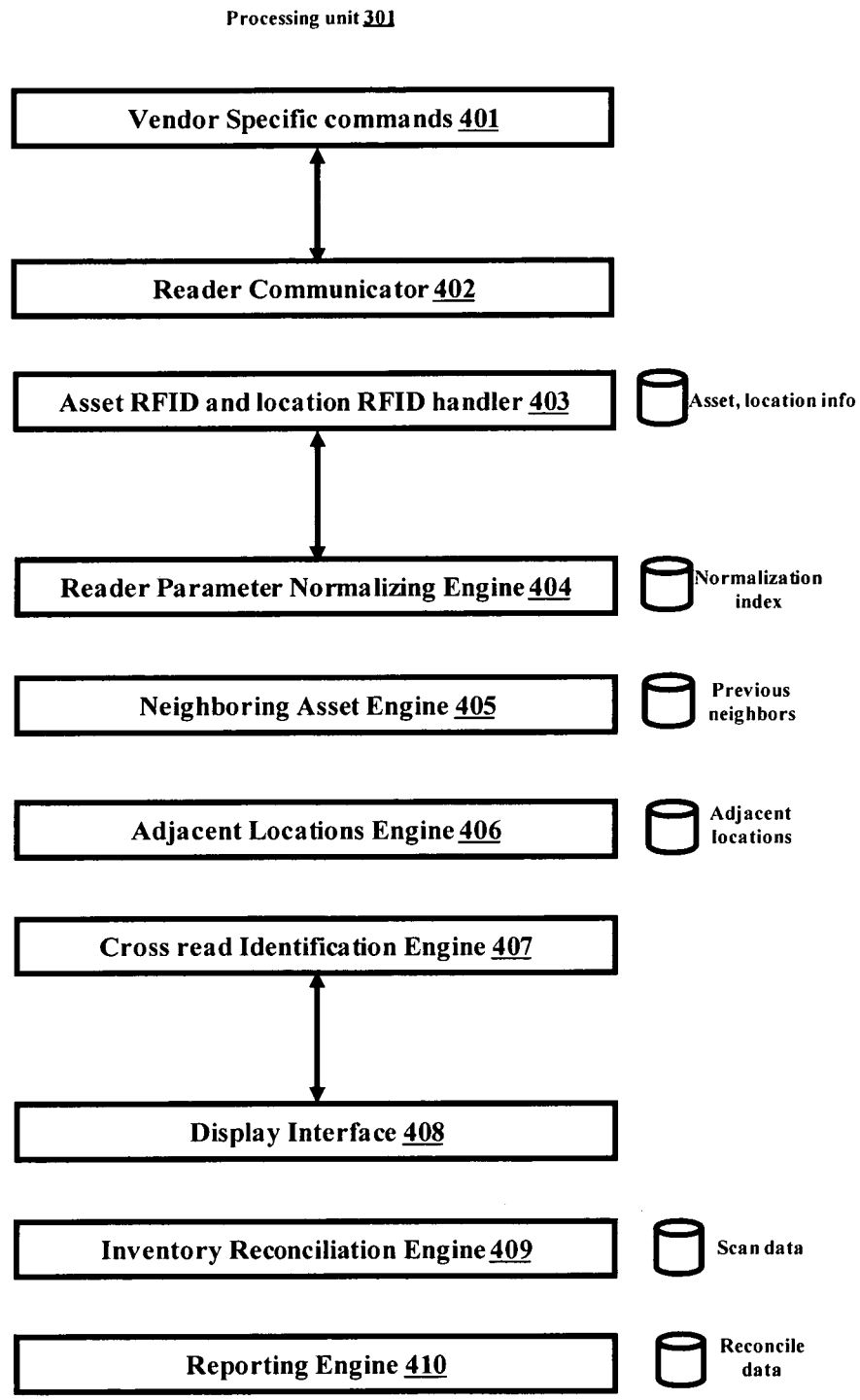
FIG. 4 illustrates architecture of an RFID inventory tracking system enabled with cross read detection, according to embodiments as disclosed herein.

FIG. 4 illustrates architecture of an RFID inventory tracking system enabled with cross read detection, according to embodiments as disclosed herein. The system comprises a vendor specific commands block 401, a reader communicator 402, an asset RFID and location RFID handler 403, a read parameter normalizing engine 404, a neighboring asset engine 405, an adjacent location engine 406, a cross read identification engine 407, a display interface 408, an inventory reconciliation engine 409 and a reporting engine 410.

The vendor specific command block 401 contains specific communication protocols through which the RFID reader 101 can be operated. Desired commands may be issued to the RFID reader 101 through this module.

The reader communicator 402 issues vendor prescribed commands to the RFID reader 101. Reader communicator 402 also captures responses from the RFID tags being scanned. The reader communicator 402 further captures responses that include read parameters like RSSI, read count corresponding to each tag being scanned.

The asset RFID and location RFID handler 403 is responsible for obtaining scanned information from the tags of the inventory. There are two types of tags that are scanned namely Asset tag and Location tag. The asset tags contain information about the asset to which the tag is attached. The location tag contains information about the location being read. If the tag read is an asset tag, the asset RFID and location RFID handler 403 retrieves information about the tag being scanned whereas if the tag scanned is a location tag, it retrieves information about the location being scanned.

The read parameter normalizing engine 404 of the system obtains raw data from scanning by means of the reader communicator 402. The raw data is generally time/trigger sliced wherein the trigger could be a hardware trigger or a soft trigger controlled by the user. The data is then normalized based on a predefined normalization index. The normalization index table is formulated based on the type of the tag and the type of asset the tag is pasted on.

The neighboring asset engine 405 looks at every inventory scanned and determines the neighboring inventory (asset) for every inventory that is scanned. Later, when an element is suspected to be a cross read, it can be cross checked with the neighboring asset sets to ensure if it is a cross read item or not. The neighboring asset engine 405 also manages the history of neighboring assets over time.

The adjacent location engine 406 is used for the purpose of forming adjacent location map. The engine builds adjacent location map by looking at the sequence and scan times of locations being scanned over time. The map thus formed can be used to provide adjacent locations for a given location. In an embodiment, the adjacent location map can be supplied by the user or collected by performing a site survey.

The cross read identification system 407 obtains output of normalizing engine 404, neighboring asset engine 405 and adjacent location engine 406 as its input. The obtained data is then analyzed. The cross read identification system 407 further provides a conclusive result for every asset being cross read or not.

The display interface 408 provides on screen feedback to the user about the assets being scanned.

The inventory reconciliation engine 409 does a comparison between prior inventory scan data and the present scan output. This comparison gives information about new, found and missing items. The reporting engine 410 displays result of reconciled data to the user.

Figure 5:
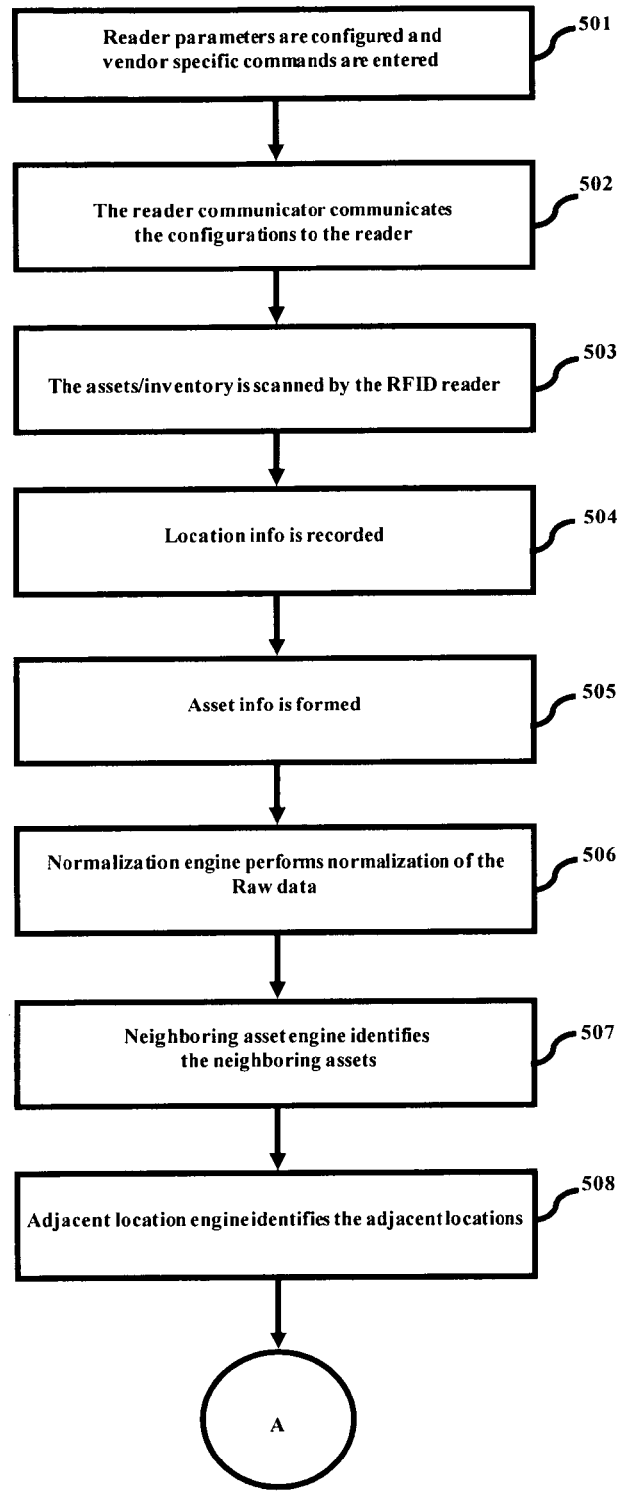
FIG. 5 illustrates a flow diagram of the algorithm for identifying and eliminating cross reads, according to embodiments as disclosed herein.
Figure 5:
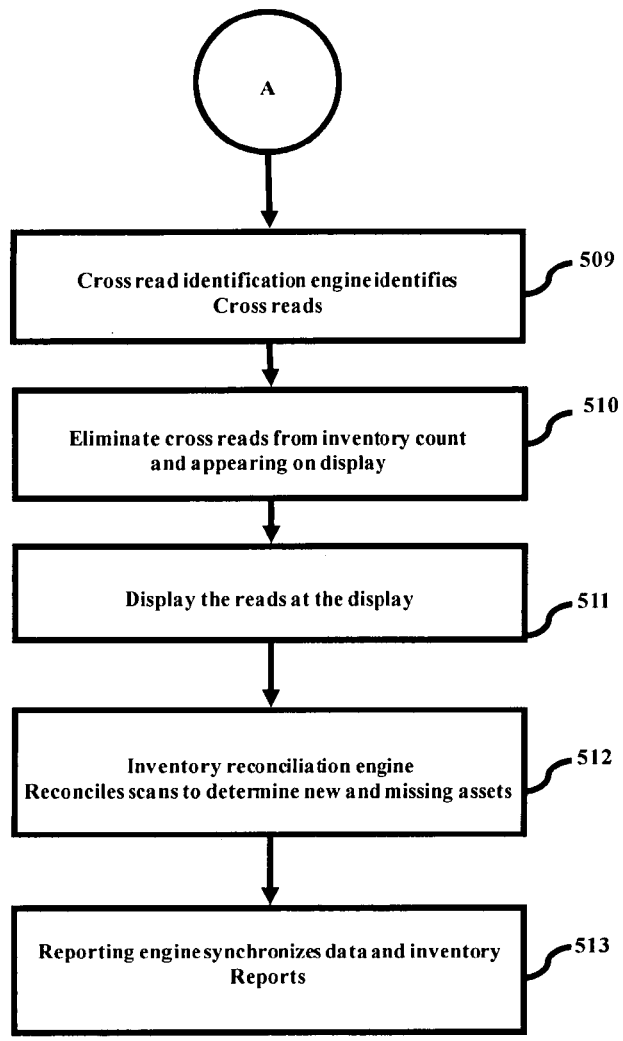

FIG. 5 illustrates a flow diagram of the entire algorithm for identifying and eliminating cross reads, according to embodiments as disclosed herein. The reader configurations are specified (501). The reader configurations may include a set of RFID parameters like RSSI and read count. The vendor specific commands are input using the vendor specific command block 401. The vendor specific command block 401 contains specific communication protocols through which the RFID reader 101 can be operated. These protocols are used when user issues commands to the reader 101. The reader communicator 402 issues (502) vendor prescribed commands to the reader. The inventories are being scanned (503). The RFID reader 101 captures responses from the RFID tags being scanned. The responses include read parameters like RSSI, read count corresponding to each tag being scanned. The location tag contains information about the location at which it is placed. By scanning the location tag, information about the location being scanned at that particular instant is obtained and recorded (504). Asset tag contains information about the asset to which it is attached. By scanning the asset tags, information about the assets are obtained and recorded (505). The information thus obtained as a result of scan is sent to the normalization engine where normalization of the raw data is done (506). The normalizing engine collects the raw data. The raw data is then time or trigger sliced and then normalization is done based on a predefined normalization index. The normalized data is fed into the neighboring asset engine where the neighboring assets are identified (507). The neighboring asset engine 405 looks at every asset scanned and determines the neighboring asset for every asset scanned. Later, when an element is suspected to be a cross read, it can be cross checked with the neighboring asset sets to insure if it is a cross read item or not. Once neighboring asset sets are identified, the data is further fed into an adjacent location engine. The adjacent location engine 406 is used for the purpose of forming (508) adjacent location map based on the adjacent locations being identified for a particular location. The adjacent location engine builds adjacent location map by looking at the sequence and scan times of locations being scanned over time. The map thus formed can be used to provide adjacent locations for a given location.

Further, the cross read identification system 407 obtains output of normalizing engine 404, neighboring asset engine 405 and adjacent location engine 406 as its input, analyzes them and provides a conclusive result for every asset being cross read or not (509). The cross read filter present in the system obtains data from the cross read identification engine and eliminates (510) cross reads from appearing on the display and from being counted in the inventory list. The information which is free from cross reads is fed into the display interface 408 which provides on screen feedback to the user about the assets being scanned (511). The inventory reconciliation engine 409 does a comparison (512) between prior inventory scan data and the present scan output. This comparison gives information about new, found and missing items and the reporting engine 410 displays (513) result of reconciled data to the user. The various actions in method 500 may be performed in the order presented, in a different order or simultaneously. Further, in some embodiments, some actions listed in FIG. 5 may be omitted.

Figure 6:
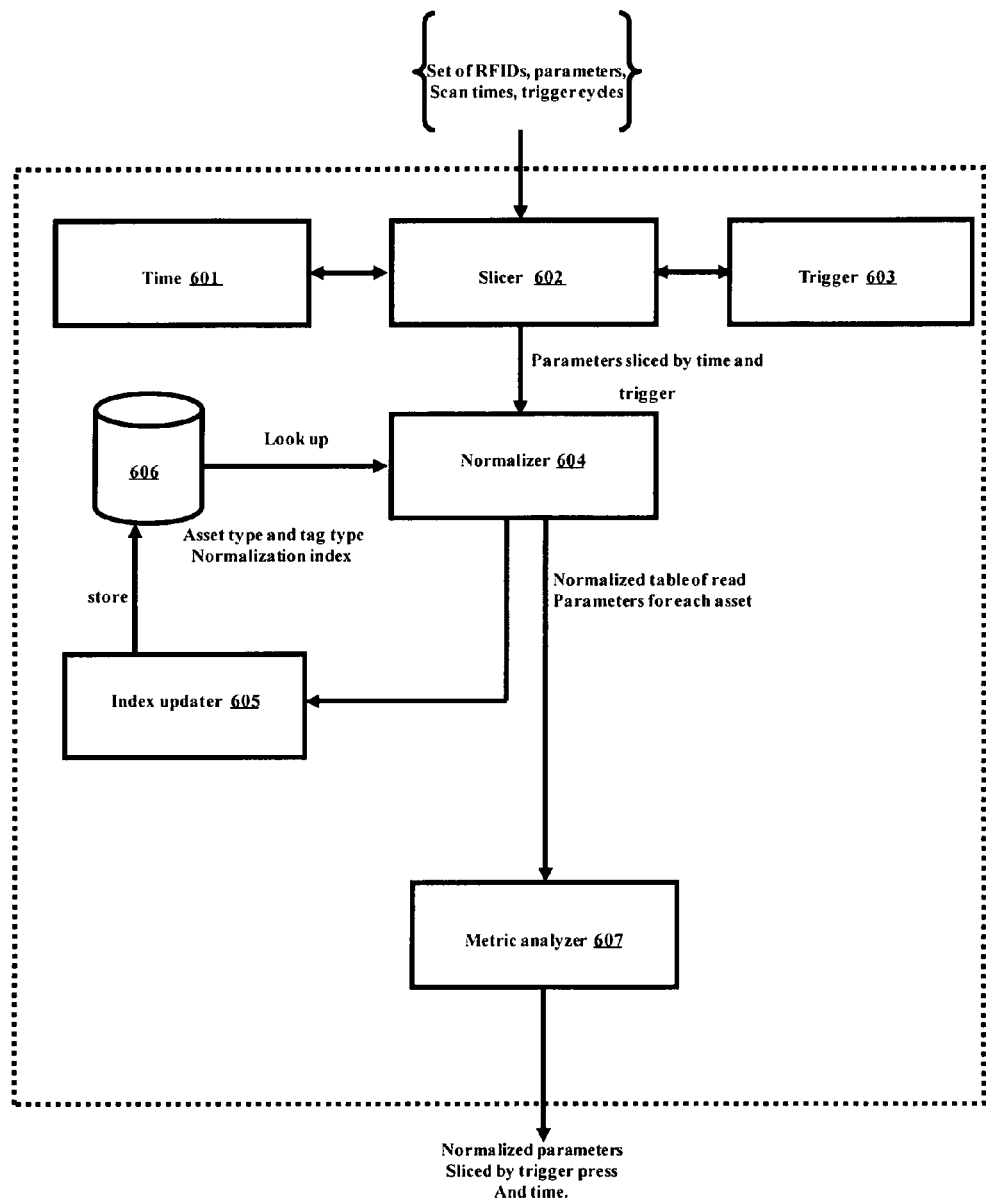
FIG. 6 illustrates a block diagram of a normalization engine for generating normalized parameters, according to embodiments as disclosed herein.

FIG. 6 illustrates a block diagram of a normalization engine for generating normalized parameters, according to embodiments as disclosed herein. The system comprises time block 601, slicer block 602, trigger block 603, a normalizer 606, an index updater 604 and a metric analyzer 605.

The time block 601 and trigger block 603 are interfaced to the slicer block 602. The slicer block 602 slices the raw parameters obtained based on either time or trigger in order to perform normalization.

The normalizer 604 present in the system obtains raw data which is output from the read parameters of the inventory. The raw data is time/trigger sliced. Further, the normalizer 604 performs normalization on this data based on a predefined normalization index 606.

The index updater 605 obtains its input from the normalizer 604. The obtained values are further employed to update the normalization index 606.

The normalization index 606 consists of predefined values for read count and received signal strength based upon which the normalizer 604 performs normalization to obtain normalized parameters.

The metric analyzer 607 accepts normalized table of read parameters for each asset as its input and gives normalized parameters sliced by trigger press and time as its output.

Figure 7:
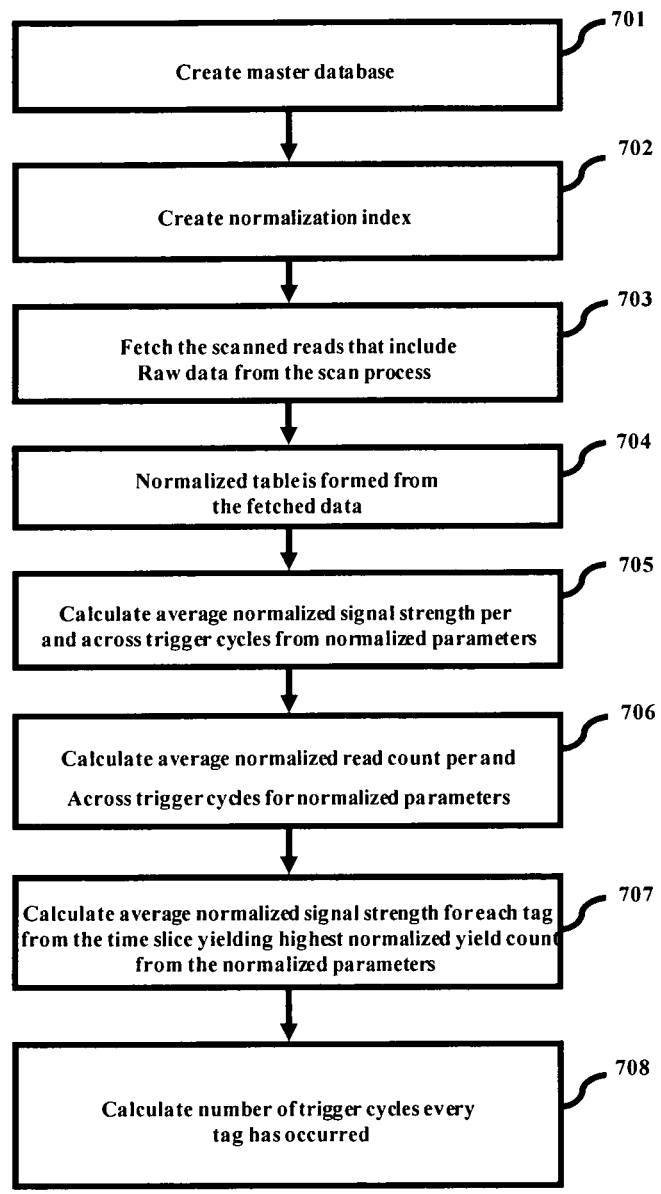
FIG. 7 illustrates a flow diagram of the process of generating normalized parameters using a normalization engine, according to embodiments as disclosed herein.

FIG. 7 illustrates a flow diagram of the process of generating normalized parameters using a normalization engine, according to embodiments as disclosed herein. A master database is created (701) initially. The master database is created using parameters like tag Id, asset type and tag type. These parameters can be used as a reference in order to identify assets corresponding to each tag and the tag type. A normalization index 606 is created (702) which consist of predefined values for read count and received signal strength based upon which the normalizer 604 performs normalization to obtain normalized parameters. Normalizing a parameter information further comprises the characteristics of the RFID tag of respective model and vendor of said detected RFID tag. User performs scan using mobile RFID reader. The scanned data fetched (703) during the scan contains raw data which is processed further in order to obtain normalized parameters. The fetched raw data is fed to the normalizer 604 which forms (704) the normalized parameters based on the normalization index 606. The average normalized signal strength is calculated (705) and average normalized read count is calculated (706) per trigger cycle and across the trigger cycles using normalized parameters. The average normalized signal strength for each tag from the time slice yielding highest normalized yield count from the normalized parameters is calculated (707). From the scanned data number of trigger cycles each tag has occurred is calculated (708). The various actions in method 700 may be performed in the order presented, in a different order or simultaneously. Further, in some embodiments, some actions listed in FIG. 7 may be omitted.

Figure 8:
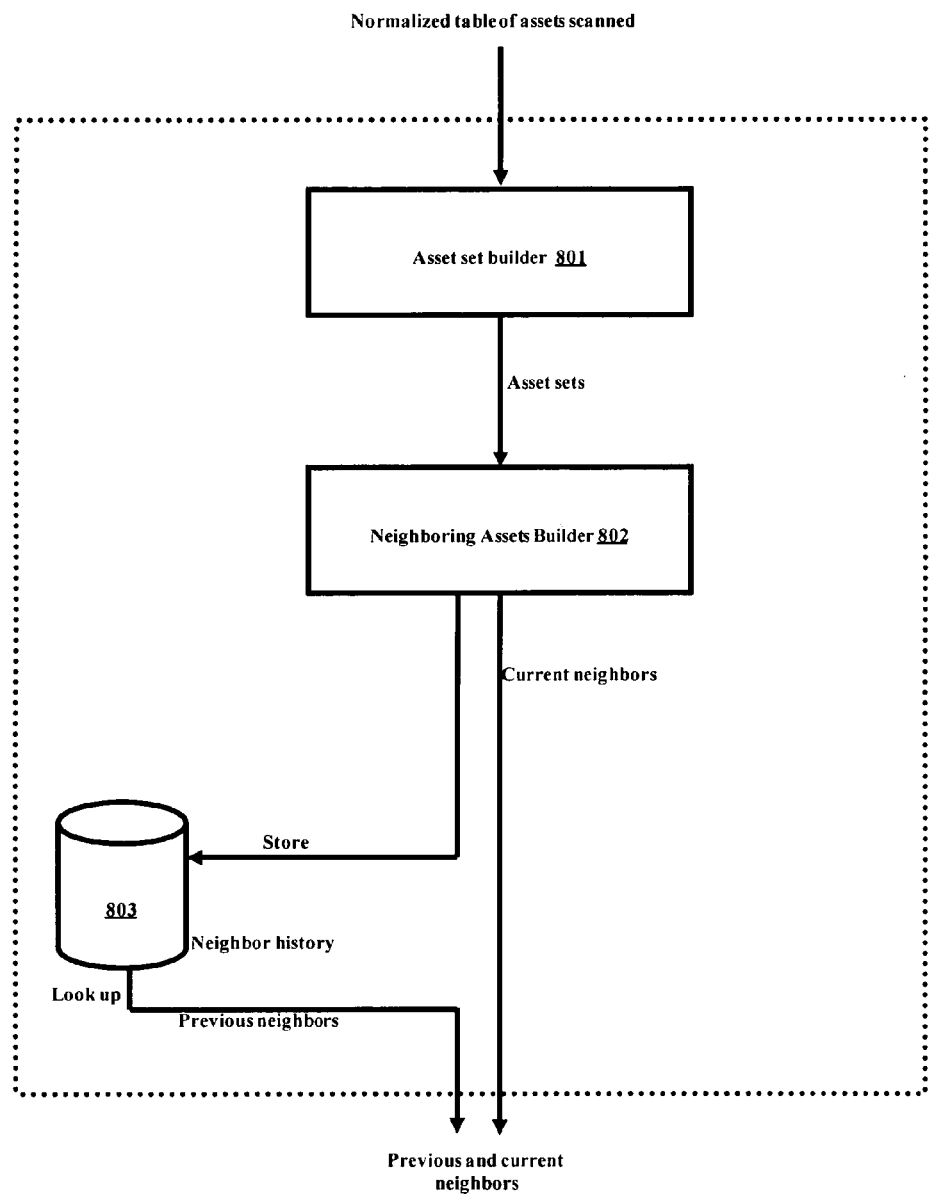
FIG. 8 illustrates a block diagram of a neighboring asset engine for forming asset sets, according to embodiments as disclosed herein.

FIG. 8 illustrates block diagram of a neighboring asset engine for forming asset sets, according to embodiments as disclosed herein. The system comprises of an asset set builder 801, a neighboring asset builder 802 and neighbor history 803.

The asset set builder 801 is used for the purpose of building asset sets based on the scan results. The asset set builder 801 accepts normalized table of scanned assets as its input from the RFID reader 101. The asset set builder 801 then performs a check on the data and builds asset sets. In order to build the asset sets, the system considers all the assets that are read in a particular time slice and groups them into one. The grouped asset together form the asset sets.

The neighboring asset builder 802 accepts the asset sets formed by the asset set builder as its input, analyzes the data and based on analysis it determines neighboring assets for each assets. This can be used as a reference to check if an item is a cross read or not by checking if that particular item belongs to any neighboring sets of the scanned asset.

The neighbor history 803 is a look up table and contains details regarding previous neighboring asset sets for each particular asset. It accepts current neighbor list of each asset from the neighboring asset builder 802 and performs a comparison. During the comparison, the system takes into account the present data and previous history of the assets, the system then determines if the asset has moved or not and if there is any change in the neighboring assets of a particular asset.

Figure 9:
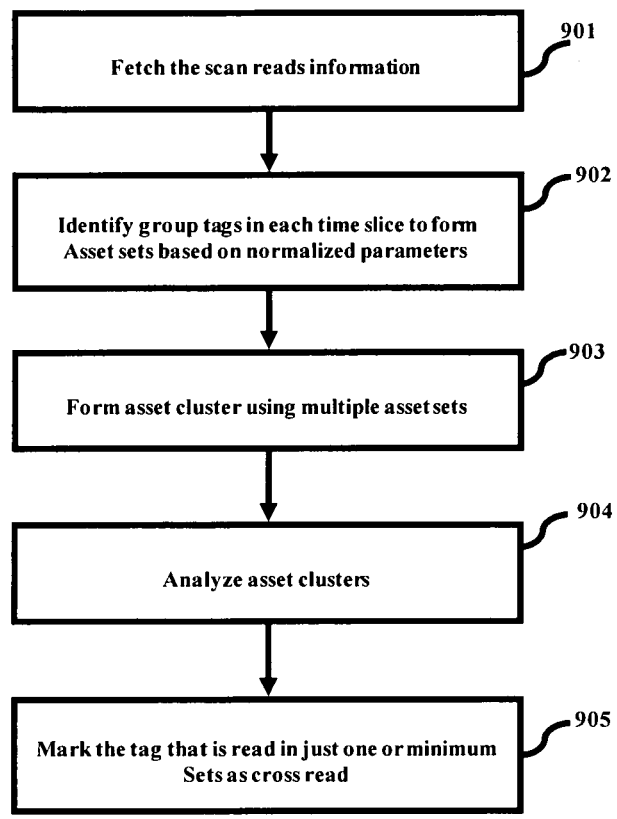
FIG. 9 illustrates a flow diagram of the process of forming asset sets using a neighboring asset engine, according to embodiments as disclosed herein.

FIG. 9 illustrates a flow diagram of the process of forming asset sets using an asset engine, according to embodiments as disclosed herein. User performs scan using the mobile RFID reader 101. The data obtained as a result of scanning is fetched (901) for further processing. In order to form an asset set, a particular time slice is considered and the elements which are being scanned in the considered time slice are grouped (902) to form an asset set. Multiple asset sets are grouped (903) to form an asset cluster. The asset clusters are then analyzed (904) to in order to detect if any cross reads are present or not. During analysis, multiple asset clusters are analyzed. A normally read tag will be a member of multiple asset clusters whereas a cross read tag will be found in only one set or in a minimum number of sets. The tag which is found to be present in only one cluster or in a minimum number of clusters is potentially marked as a cross read tag (905). The various actions in method 900 may be performed in the order presented, in a different order or simultaneously. Further, in some embodiments, some actions listed in FIG. 9 may be omitted.

Figure 10:
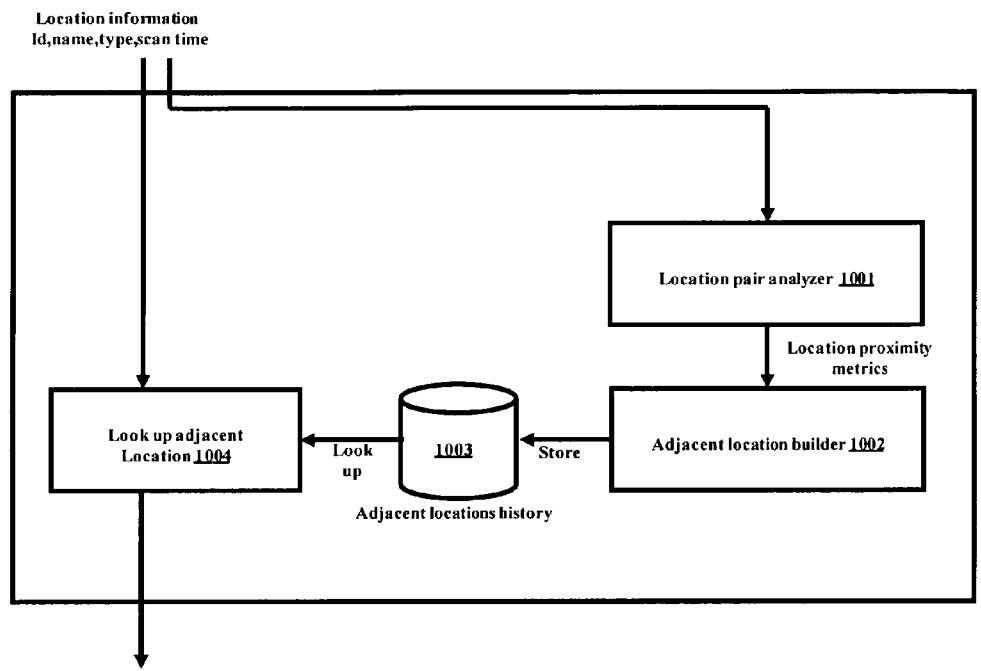
FIG. 10 illustrates a block diagram of an adjacent location engine for forming location maps, according to embodiments as disclosed herein.

FIG. 10 illustrates a block diagram of an adjacent location engine for forming location maps, according to embodiments as disclosed herein. The system consists of a location pair analyzer 1001, adjacent location builder 1002, an adjacent location history 1003 and a look up adjacent location 1004.

The location pair analyzer 1001 accepts parameters like location information id, name, and type and scans times as its inputs and analyzes the same. From the analysis the system identifies locations which are next to each other.

The adjacent location builder 1002 accepts the location proximity metrics, which is the output of location pair analyzer and based on the data it determines which locations are adjacent to each other. There will be locations which will appear in multiple pairs. In this case, the system forms links and arrives at an imaginary spatial arrangement of locations.

The adjacent locations history 1003 obtains and stores data regarding present adjacent location for each location. The block 1003 also contains the history of previous adjacent locations which are stored during previous scans.

The look up adjacent location block 1004 performs a comparison between the present locations with the adjacent locations history to check if there is any variation in the history. In an example, if an asset A was previously read in a location X, and after sometime in another read say the asset A is again being read in location Y. The cross read engine can determine if the two locations are far apart or are adjacent to each other. If the locations X and Y are far apart the cross read engine can conclusively say that the asset is not a cross read.

Figure 11:
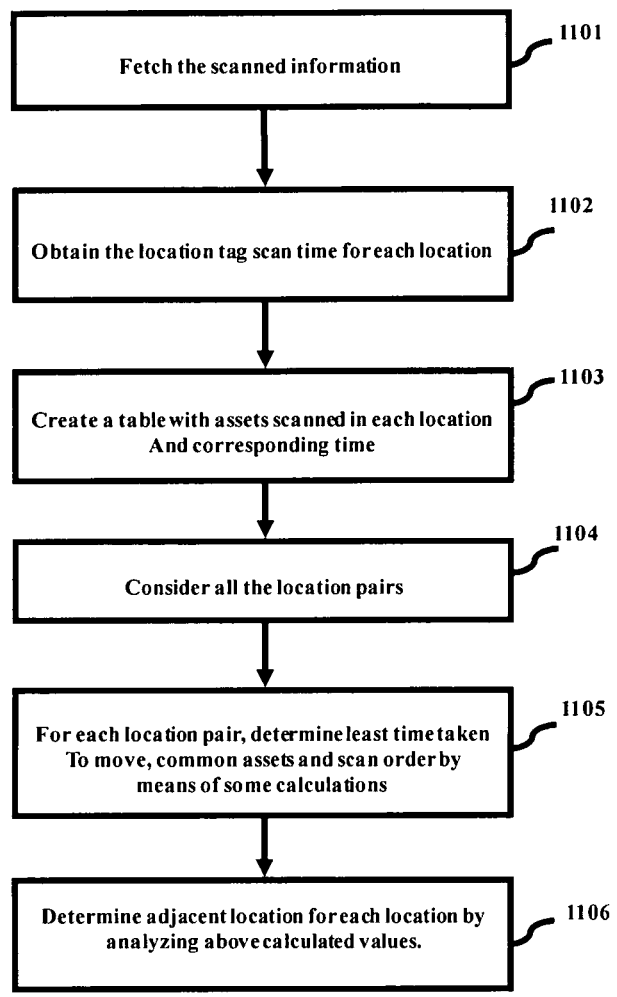
FIG. 11 illustrates a flow diagram of the process of forming spatial location maps using an adjacent location engine, according to embodiments as disclosed herein.

FIG. 11 illustrates a flow diagram of the process of forming spatial location maps using an adjacent location engine, according to embodiments as disclosed herein. User performs a scan using a mobile RFID reader 101. The data obtained as a result of scan is fetched (1101) and from the raw data thus obtained, location tag scan time for each location is calculated (1102). A table is created with the assets scanned in each location and the corresponding time (1103). All possible location pairs are considered and for each location pair, parameters like least time taken to move, common assets and scan order are determined (1105) by performing basic computations. By analyzing these parameters, adjacent location for each location are determined (1106). The adjacent locations are then taken into account to determine if an asset is a cross read or not. If an asset was previously read in a location that is not adjacent to the current location, it can be said that the asset is not a cross read asset. The various actions in method 1100 may be performed in the order presented, in a different order or simultaneously. Further, in some embodiments, some actions listed in FIG. 11 may be omitted.

Figure 12:
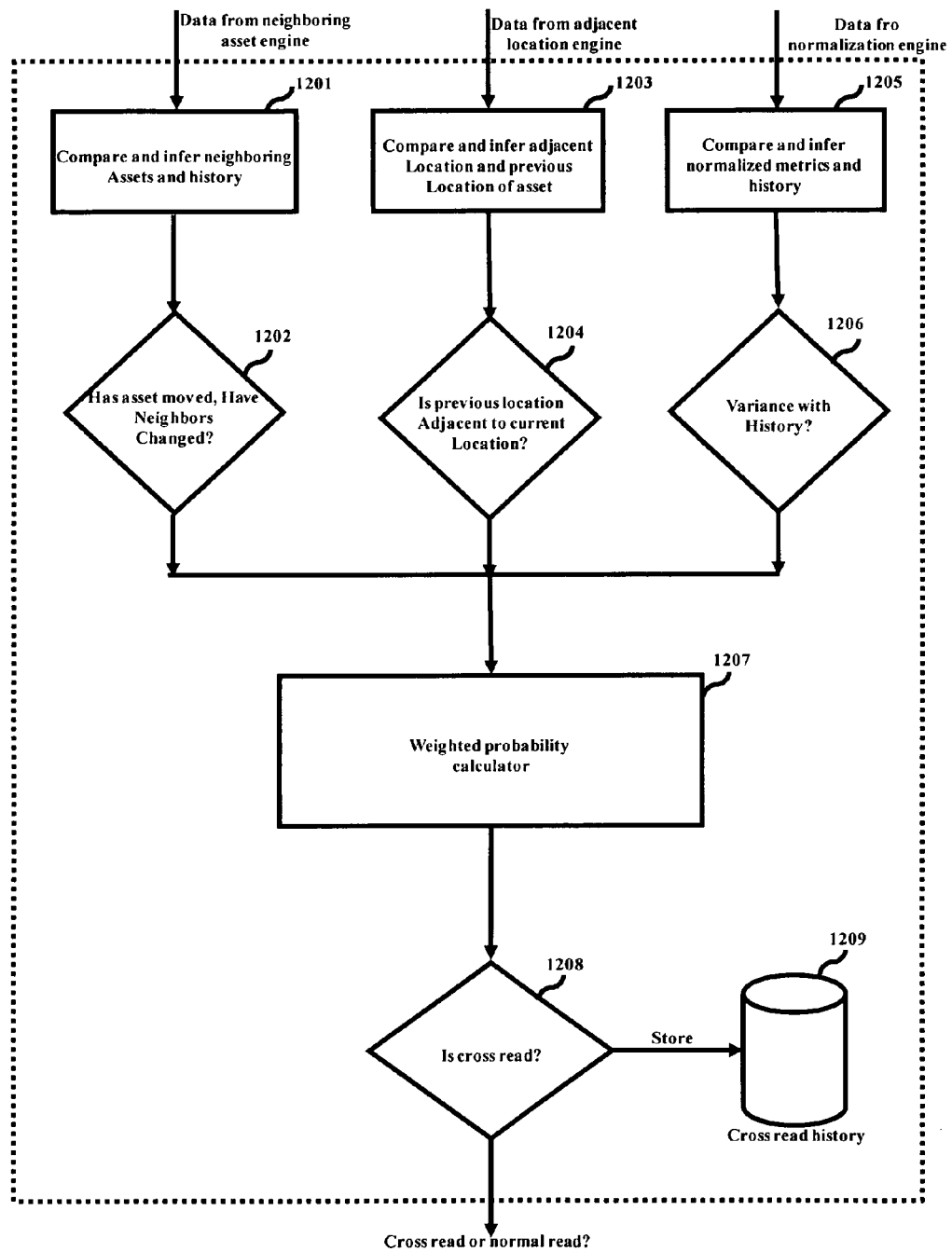
FIG. 12 illustrates a block diagram of a cross read identification engine for determining cross reads, according to embodiments as disclosed herein.

FIG. 12 illustrates a flow diagram of a process of cross read identification for determining cross reads, according to embodiments as disclosed herein. Data from neighboring asset engine is compared with the asset set history (1201) and based on this comparison, system determines (1202) if the asset has moved or if the neighbors of considered asset have changed or not. Data from adjacent location engine is compared (1203) with previous location of asset and based on the comparison, system determines (1204) if previous location of the asset is adjacent to current location or not. Similarly, data from normalization engine is compared (1205) with the metric history to check (1206) if there is any variation in the metric history. The above described comparison results are fed into a weighted probability calculator (1207) and the weighted probability calculator calculates a weighted sum for each asset based on the comparison results. By checking the weighted sum value, system determines (1208) if the considered asset is a cross read or not. If the considered asset is found to be a cross read item, details of that asset will be stored (1209) in cross read history. The various actions in method 1200 may be performed in the order presented, in a different order or simultaneously. Further, in some embodiments, some actions listed in FIG. 12 may be omitted.

Figure 13A:
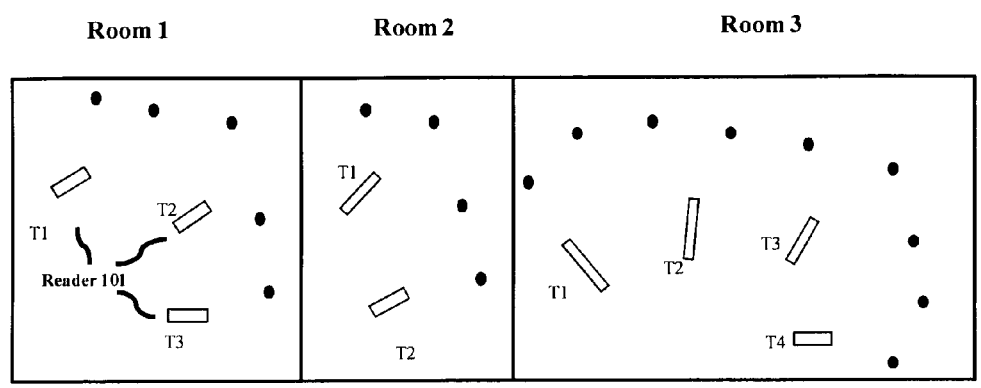
FIGS. 13a, 13b and 13c illustrates an example implementation of using the RFID reader to scan inventory, according to embodiments as disclosed.
Figure 13B:
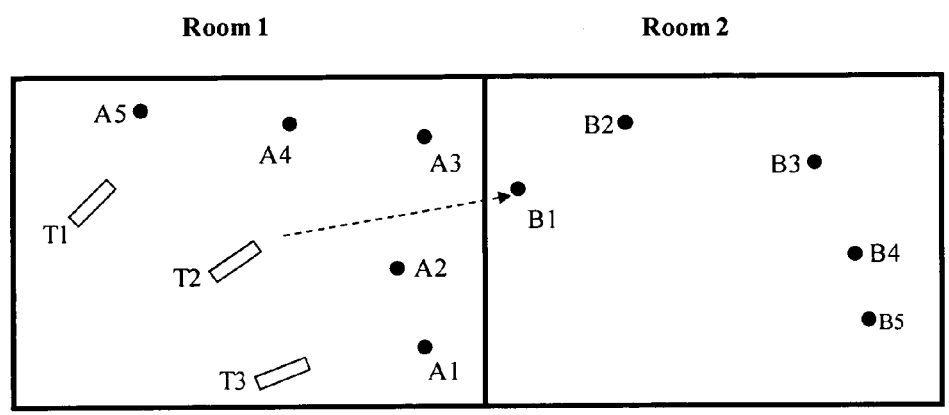
Figure 13C:
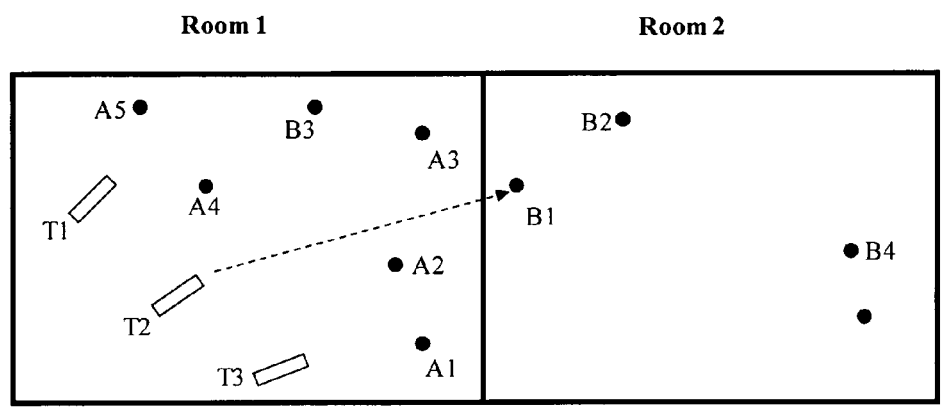

FIGS. 13*a*, 13*b* and 13*c* illustrates an example implementation of using the RFID reader and the way asset sets are formed based on scan results performed on day 1 and day 2, according to embodiments as disclosed herein. The system employs a mobile RFID reader 101 in order to determine any cross reads. The mobile RFID reader is a hand held device which is carried by the user. User decides the location to be scanned and using the RFID reader 101, user performs scan. Consider the scenario where user performs scan in Room 1. The scan is carried out in different time slices and based on the trigger press. The reader scans the tags and the information stored in tags are fetched. The raw data obtained as a result of scan is then fed into the normalization engine for the process of normalization. In order to perform normalization, a master database is created with parameters like tag Id, asset type and tag type. Given below is an example of a master database.

| Tag ID | Asset Type | Tag Type |
| --- | --- | --- |
| A1 | LCD Monitor | Foam |
| A2 | Printer | Label |
| A3 | CRT Monitor | Foam |
| A4 | Scanner | Label |
| A5 | LCD Monitor | Foam |
| B1 | Printer | Label |
| B2 | LCD Monitor | Foam |
| B3 | Scanner | Label |
| B4 | Printer | Label |
| B5 | CRT Monitor | Foam |

Similarly a normalization index is created with the received signal strength (RSSI) and read count for each asset.

This normalization index is used as a look up table. Given below is an example of normalization index.

| | Tag Type | RSSI.Norm.Index | Read count Norm.Index |
| --- | --- | --- | --- |
| CRT Monitor | Foam | 65 | 25 |
| LCD Monitor | Foam | 75 | 35 |
| LCD Monitor | Label | 55 | 17 |
| Printer | Label | 65 | 20 |
| Scanner | Label | 65 | 20 |

In an embodiment, read count is the number of times an RFID tag is picked up by the reader. From read count, parameters like number of times a particular tag is read in a single trigger press, number of times a particular tag is read across all trigger presses, number of trigger presses in which a tag is read, number of time slices a tag is read are calculated. These calculated metrics can tell how dispersed are the reads of a particular tag and the probability of a tag being cross read or not.

Similarly, the signal strength taken to read a tag is calculated. The cross read tags are identified based on average received signal strength indication value for each tag (RSSI) and highest and lowest RSSI value for each tag.

User performs scan in each locations/rooms to obtain the information associated with each tag. Within a room/location, scan is performed in different time slices and the number of time slices within a location depends upon total area to be covered within that location and the range of operation of RFID reader. Once the scan is performed in desired area, a table is created with all the raw data obtained as a result of scan. Given below is an example of such a table.

| Event | Time | Read Count | Signal Strength | Tag ID |
| --- | --- | --- | --- | --- |
| Trigger Pressed | | | | |
| Tag Read | 10:15:25 AM | 37 | 77 | A1 |
| Tag Read | 10:15:26 AM | 17 | 61 | A2 |
| Tag Read | 10:15:26 AM | 4 | 50 | A3 |
| Tag Read | 10:15:28 AM | 26 | 72 | A1 |

-continued

| Event | Time | Read Count | Signal Strength | Tag ID |
|---|---|---|---|---|
| Tag Read | 10:15:28 AM | 24 | 70 | A2 |
| Tag Read | 10:15:29 AM | 8 | 66 | A3 |
| Trigger Released | | | | |
| Trigger Pressed | | | | |
| Tag Read | 10:15:32 AM | 16 | 60 | A1 |
| Tag Read | 10:15:32 AM | 36 | 65 | A2 |
| Tag Read | 10:15:33 AM | 21 | 65 | A3 |
| Tag Read | 10:15:33 AM | 4 | 50 | A4 |
| Tag Read | 10:15:35 AM | 40 | 74 | A3 |
| Tag Read | 10:15:35 AM | 18 | 66 | B1 |
| Tag Read | 10:15:36 AM | 15 | 66 | A4 |
| Tag Read | 10:15:38 AM | 27 | 71 | A3 |
| Tag Read | 10:15:39 AM | 20 | 65 | A4 |
| Trigger Released | | | | |
| Trigger Pressed | | | | |
| Tag Read | 10:15:41 AM | 24 | 71 | A4 |
| Tag Read | 10:15:42 AM | 28 | 66 | A5 |
| Tag Read | 10:15:43 AM | 15 | 58 | A3 |
| Tag Read | 10:15:44 AM | 22 | 69 | A4 |
| Tag Read | 10:15:45 AM | 40 | 76 | A5 |
| Trigger Released | | | | |

The raw data thus obtained as a result of scan is processed further in order to calculate normalized percentage of read count and signal strength as depicted in the figure given below.

| Trigger Cycle | Time slice | Read count normalized percentage (%) | Signal strength normalized percentage (%) | Tag Id | Asset type | Tag type |
|---|---|---|---|---|---|---|
| T1 | 10:15:25 AM | 90 | 90 | A1 | LCD monitor | Foam |
| | | 72 | 70 | A2 | Printer | Label |
| | | 15 | 34 | A3 | CRT monitor | Foam |
| | 10:15:28 AM | 84 | 80 | A1 | LCD monitor | Foam |
| | | 96 | 100 | A2 | Printer | Label |
| | | 30 | 80 | A3 | CRT monitor | Foam |
| T2 | 10:15:32 AM | 27 | 33 | A1 | LCD monitor | Foam |
| | | 125 | 70 | A2 | Printer | Label |
| | | 70 | 72 | A3 | CRT monitor | Foam |
| | | 30 | 33 | A4 | Scanner | Label |
| | 10:15:35 AM | 120 | 110 | A3 | CRT monitor | Foam |
| | | 70 | 80 | B1 | Printer | Label |
| | | 66 | 66 | A4 | Scanner | Label |
| | 10:15:38 AM | 90 | 100 | A3 | CRT monitor | Foam |
| | | 80 | 81 | A4 | Scanner | Label |
| T3 | 10:15:41 AM | 99 | 103 | A4 | Scanner | Label |
| | | 66 | 80 | A5 | LCD monitor | Foam |
| | | 50 | 60 | A3 | CRT monitor | Foam |
| | 10:15:44 AM | 90 | 97 | A4 | Scanner | Label |
| | | 100 | 92 | A5 | LCD monitor | Foam |

The normalized parameters thus formed can be further processed to yield conclusive metrics for inferring cross read items. The parameters/metrics thus calculated are average normalized signal strength per and across trigger cycles, overall average normalized read count per and across trigger cycles, highest normalized signal strength for each tag from the time slice yielding highest normalized read count and number of trigger cycles each tag has occurred.

Once normalization gets over, the neighboring asset engine identifies neighboring assets for each asset. Consider FIG. 13b which depicts scan performed in Room 1. Based on the data obtained during the scan, asset sets are formed as given below.

| Trigger cycle | Asset sets |
|---|---|
| Set 1 | A1, A2 |
| Set 2 | A1, A2, A3 |
| Set 3 | A2, A3 |
| Set 4 | A2, A3, A4 |
| Set 5 | A3, B1, A4 |
| Set 6 | A3, A4 |
| Set 7 | A3, A4, A5 |

The elements present in Room 1 during first day's scan were A1, A2, A3, A4 and A5. But while scanning, element B1 which is a member of Room 2 was cross read. While asset sets are formed, it is found that element B1 is included in only one set i.e. Set 5. The elements which are present in only one set or in a minimum number of sets are marked as cross read.

Consider FIG. 13c which depicts scan performed in Room 1 on day 2. In this case, asset B3 was moved into Room 1 before performing scan. The asset sets formed based on scan performed on day 2 is given below.

| Trigger cycle | Asset sets |
|---|---|
| Set 1 | A1, A2 |
| Set 2 | A1, A2, A4 |
| Set 3 | A2, A3 |
| Set 4 | A2, A3, B1 |
| Set 5 | A3, B3 |

-continued

| Trigger cycle | Asset sets |
|---|---|
| Set 6 | A4, B3 |
| Set 7 | A2, A3, A4, B3 |
| Set 8 | A3, B3, A4 |
| Set 9 | A4, B3 |
| Set 10 | B3, A5 |
| Set 11 | B3, A4, A5 |

While analyzing this data, it is found that asset B3 is a member of multiple asset sets whereas asset B1 is found in only one set. So B1 is marked as a cross read asset while B3 is marked as normally read asset. Here the user is able to effectively judge asset B3 as a normally read item even though he is not aware of the fact that asset B3 has been moved to room 1 from Room 2.

After forming asset sets for each asset, the adjacent location engine identifies adjacent locations for each location in order to form a spatial location map. While performing scan in each location, location tag scan time is calculated for each location by reading the location tags. Accordingly a table is formed with locations and corresponding tag scan times for a day as given below.

| Pairs | Time difference between location tag scans | Time difference between last and first tag read in pairs | Time to scan location-1$^{st}$ location of pair | Time to scan location-2$^{nd}$ location of pair | Time taken to move (time diff loc tags-time to scan loc) | Time taken to move (last tag read-loc scan time) | Common assets read? | Diff in order of scan |
|---|---|---|---|---|---|---|---|---|
| A and B | 1 min 8 sec | 40 sec | 20 sec | 1 min 30 sec | 50 sec | 20 sec | YES, 1 asset | 1 |
| A and C | 3 min 40 sec | 3 min 20 sec | 20 sec | 3 min 30 sec | 3 min 20 sec | 3 min 10 sec | No | 2 |
| A and D | 9 min 40 sec | 9 min 45 sec | 20 sec | 26 sec | 9 min 20 sec | 8 min 30 sec | No | 3 |
| B and C | 2 min 30 sec | 1 min 20 sec | 1 min 30 sec | 3 min 30 sec | 1 min | 30 sec | YES, 2 assets | 1 |
| B and D | 8 min 10 sec | 7 min 45 sec | 1 min 30 sec | 26 sec | 5 min 40 sec | 6 min 20 sec | No | 2 |
| C and D | 5 min 50 sec | 2 min 57 sec | 3 min 30 sec | 26 sec | 2 min 20 sec | 1 min 30 sec | YES, 1 asset | 1 |

| Time | Location Tag Scan |
|---|---|
| 10:14:52 AM | Room A |
| 10:16:00 AM | Room B |
| 10:18:29 AM | Room C |
| 10:24:11 AM | Room D |

Similarly another table is created with assets scanned at each location and their corresponding scan times. Such a table is given below which depicts details of assets scanned in each location for Day 1.

| ROOM A | 10:15:26 AM | A2 |
|---|---|---|
| ROOM A | 10:15:26 AM | A3 |
| ROOM A | 10:15:33 AM | A4 |
| ROOM A | 10:15:35 AM | B1 |
| ROOM A | 10:15:42 AM | A5 |
| ROOM B | 10:16:20 AM | B1 |
| ROOM B | 10:16:44 AM | B2 |
| ROOM B | 10:17:05 AM | B3 |
| ROOM B | 10:17:49 AM | B4 |
| ROOM B | 10:17:52 AM | B5 |
| ROOM C | 10:19:07 AM | C2 |
| ROOM C | 10:19:11 AM | C3 |
| ROOM C | 10:19:48 AM | B4 |
| ROOM C | 10:19:49 AM | B5 |
| ROOM C | 10:19:59 AM | C1 |
| ROOM C | 10:21:28 AM | C6 |
| ROOM C | 10:21:29 AM | C7 |
| ROOM C | 10:22:35 AM | C4 |
| ROOM C | 10:22:38 AM | C5 |
| ROOM D | 10:25:35 AM | D1 |
| ROOM D | 10:25:36 AM | C4 |
| ROOM D | 10:26:01 AM | D2 |

The data points to build the location map are time difference between last tag read in one location and first tag read in next location, scan time of all location tags and order in which locations are scanned. If the time difference between last tag read in location and first tag read in next location is less, it suggests the locations are close to each other. The locations which are next to each other are identified and based on this, location pairs are formed. Now each location pair is analyzed as given below.

In an example, if an asset A was previously read in a location X, and after sometime in another read say the asset A is again being read in location Y. The cross read engine can determine if the two locations are far apart or are adjacent to each other. If the locations X and Y are far apart the cross read engine can conclusively say that the asset is not a cross read.

By performing calculations, parameters like least time taken to move, common assets and scan order are calculated. These are the metrics that can determine adjacent locations.

From the above analysis, it can be deciphered that locations A and D are not adjacent to each other. Lets say an asset was scanned in Location D on Day 1. On Day 2 the same asset is scanned in Location A. Since the adjacent location engine has determined that locations A and D are not adjacent to each other, it can be conclusively said that the asset being read in Location A is not a cross read.

The output of Normalization engine 404, Neighboring asset engine 405 and Adjacent location engine 406 are compared with corresponding history and the observed result is fed as input to the Cross read identification engine 407 which calculates a weighted sum for each tag depending upon the inputs obtained. The system determines if the asset is a cross read asset or not based on the weighted sum value. An index is built based on the cross read metric history per asset, per location, per asset type/tag type. This index is termed as Cross read history.

System keeps track of all actions performed by user for every asset, asset type, since it is a valuable source of information to identify cross reads.

Certain trends that can add additional parameters to validating or invalidating cross read detection algorithm are monitored. Such trends include asset scan history and location scan history.

When user scans a particular room, the system identifies cross reads if any and informs user immediately at the time of scan. This is called cross read detection. After the locations are scanned in an inventory cycle, system can co-relate the metrics from different locations to get accurate picture of cross reads Vs normal reads at every location. Based on the differentiation the cross reads may be eliminated. This is performed by a Cross read filter.

The embodiments disclosed herein can be implemented through at least one software program running on at least one hardware device and performing network management functions to control the network elements. The network elements shown in FIG. 4 include blocks which can be at least one of a hardware device, or a combination of hardware device and software module.

The embodiment disclosed herein describes a RFID system that is employed for detecting and eliminating cross reads in RFID. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The hardware device employed can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the embodiments may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of identifying at least one RFID tag that is cross read in at least one location of a facility using at least one mobile RFID reader, said method comprising:
    obtaining information on a plurality of parameters from said RFID tag in said facility through scanning the location by said RFID reader, wherein said scanning is performed on at least one of an asset tag and a location tag, wherein said asset tag comprises information about an asset of said RFID tag and said location tag comprises information about said location of said RFID tag;
    recording said obtained information related to identifying said RFID tag in said location by said RFID reader, wherein said tag is one of an active tag and a passive tag, and wherein said tag is the active tag if a power source of said RFID tag is located internally and said tag is the passive tag if a power source of said RFID tag is from energy transferred using radio frequency from said RFID reader;
    normalizing said obtained parameter information for each detected RFID tag at said location scanned by said RFID reader, wherein said normalizing is performed based on a predefined normalization index, wherein said predefined normalization index is formulated based on at least one of type of said RFID tag and type of asset said RFID tag is pasted on, and said normalized parameter information is used to identify a plurality of neighboring assets;
    formulating one or more sets of said plurality of neighboring assets scanned by said RFID reader, wherein a cluster of said plurality of neighboring assets is formulated based on said obtained normalized parameters;
    formulating one or more spatial location maps of neighboring locations scanned by said RFID reader, wherein at least location pair analysis is performed to identify said at least one cross read and wherein said neighboring locations are scanned to co-relate one or more metrics, wherein said scanning is performed to analyse one or more sequences and scan times of said location being scanned over a period of time for detecting said at least one cross read;
    performing a comparison between at least one of a prior inventory scan data and a present scan output to provide information about at least one of a new, found and missing item;
    displaying a result of reconciled data to a user after performing said comparison; and
    eliminating said at least one cross read alter said scanning of the location, wherein said cross read identified, said plurality of neighboring assets identified, and said adjacent location map formulated is stored in a database as historical information, wherein said historical information is used to identify said at least one cross read in at least one subsequent scan.

2. The method as in claim 1, wherein said plurality of parameters comprises at least one of:
    radio frequency signal strength (RSSI);
    a count of the number of said RFID tag detections; and
    time-stamp of when each of the said RFID tags were detected, wherein said plurality of parameters are normalized by analysing scanned data, wherein said cross read is eliminated based on the normalized parameters.

3. The method as in claim 1, wherein normalizing said obtained parameter information comprises:
    fetching scanned data to obtain at least one normalized parameter;
    analyzing a transaction cycle within a location scan wherein said transaction cycle is dissected;
    creating a master database using said parameter information;
    creating at least one normalizing index comprising of at least one predefined value based on said parameter information wherein the predefined value of the said parameter information corresponds to the type of asset to which said detected RFID tag is attached to and the characteristics of the RFID tag of respective model and vendor of said detected RFID tag;
    forming said at least one normalized parameter based on said at least one normalizing index; and
    calculating at least one of average normalized signal strength for said RFID tag based on said at least one normalized parameter to identify at least one neighboring asset set.

4. The method as in claim 3, wherein said method further comprises of dissecting said transaction cycle, by at least one of time slices and trigger press of said RFID reader, wherein a trigger is one of a hardware trigger or a soft trigger and further wherein at least one said trigger press calculates probability of said RFID tag being cross read.

5. The method as in claim 1, wherein formulating at least one set of neighboring assets comprises:
    identifying at least one asset set that is scanned in at least one same time slice;
    forming at least one cluster of neighboring asset based on said normalized parameters; and
    processing said neighboring asset to yield at least one conclusive metric for inferring at least one said cross read, wherein said processing of neighboring asset sets includes comparison to neighboring asset sets formed for said tag from previous scan.

6. The method as in claim 1, wherein formulating spatial location maps of neighboring locations comprises
obtaining information and storing said information pertaining to said identified location;
identifying one or more locations that are in proximity to said identified location by analysing at least one of time difference between sequential reads between at least two adjacent locations, scan time of all location tags, and order of scanning of said one or more locations;
analysing at least one parameter from at least one of least time taken to move, common assets and scan order to determine accuracy of said adjacent location;
performing a comparison between at least one present location and at least one said adjacent location;
analysing said at least one asset to determine if said asset is cross read;
creating a map of said locations identified after forming at least one asset set for said asset and analysing at least one of a sequence and a scan time of said locations scanned.

7. A system for identifying at least one RFID tag that is cross read in at least one location of a facility using at least one mobile RFID reader, said system comprising:
a normalizing engine configured to obtain information on at least one parameter from one or more RFID tags in said facility by scanning the location, wherein said scanning is performed on at least one of an asset tag and a location tag, wherein said asset tag comprises information about an asset of said RFID tag and said location tag comprises information about said location of said RFID tag;
said RFID reader configured to record said information related to identifying said RFID tag in said location, wherein said tag is one of an active tag and a passive tag, wherein said tag is the active tag if the power source of a tag is located internally and said tag is the passive tag, if a power source of said RFID tag is from energy transferred using radio frequency from said RFID reader;
a processing unit configured to normalize said obtained parameter information for each detected RFID tag at said location scanned by said RFID reader, wherein said normalizing is performed based on a predefined normalization index, wherein said predefined normalization index is formulated based on at least one of type of said RFID tag and type of asset said RFID tag is pasted on and said normalized parameter information is used to identify a plurality of neighboring assets;
a spatial location engine configured to create a spatial location map based on said location scanned to perform location pair analysis, wherein said location pair analysis is performed to identify said at least one cross read and wherein said neighboring locations are scanned to co-relate one or more metrics by looking at one or more sequences and scan times of one or more locations being scanned over a period of time for detecting said at least one cross read;
an asset engine configured to formulate at least one set of neighboring assets, wherein said asset engine is further configured to determine at least one neighboring asset for said asset being scanned; and
an inventory reconciliation engine configured to perform a comparison between at least one of prior inventory scan data and a present scan output to provide information about at least one of a new, found and missing items;
a reporting engine configured to display a result of reconciled data to a user after performing said comparison; and
said RFID reader configured to eliminate said at least one cross read after said scanning of the location, wherein identified cross read asset, identified neighboring assets and an adjacent location map formulated is stored into a database as historical information wherein said historical information is used to identify one or more cross reads in subsequent scans.

8. The system as in claim 7, wherein said at least one parameter is at least one of:
radio frequency signal strength (RSSI);
a count of the number of said RFID tag detections; and
time-stamp of when each of the said RFID tags were detected, wherein said plurality of parameters are normalized by analysing scanned data, wherein said cross read is eliminated based on the normalized parameters.

9. The system as in claim 7, wherein normalizing said obtained parameter information in said system comprises a means for:
fetching scanned data to obtain at least one normalized parameter;
analyzing a transaction cycle within a location scan wherein the transaction cycle is dissected;
creating a master database using said parameter information;
creating at least one normalizing index comprising of at least one predefined value based on said parameter information, wherein the predefined value of said parameter information corresponds to the type of asset to which said detected RFID tag is attached to and the characteristics of the RFID tag of respective model and vendor of said detected RFID tag;
forming said at least one normalized parameter based on said at least one normalizing index; and
calculating at least one of average normalized signal strength for said RFID tag based on said at least one normalized parameter to identify at least one neighboring asset set.

10. The system as in claim 9, wherein said system further comprises of at least one means for dissecting said transaction cycle by at least one of time slices and trigger press of said reader, wherein a trigger is one of a hardware trigger or a soft trigger and further wherein at least one said trigger press calculates probability of said RFID tag being cross read.

11. The system as in claim 7, wherein formulating at least one set of neighboring assets in said system comprises a means for
identifying at least one asset set that is scanned in at least one same time slice;
forming at least one cluster of neighboring asset based on said normalized parameters; and
processing said neighboring assets to yield at least one conclusive metric for inferring at least one said cross read, wherein said processing of neighboring assets includes a comparison to said cluster of neighboring assets formed for said tag from a previous scan.

12. The system as in claim 7, wherein in order to formulate spatial location maps of neighboring locations, said system further comprises at least one means for
identifying locations that are in proximity from using at least one of fetched location information, time difference between sequential reads between at least two adjacent locations, scan time of all location tags, and order of scanning of locations;

creating a map of said locations identified after forming at least one asset set for said asset and analysing at least one of a sequence and a scan time of said locations scanned.

13. A RFID reader configured for identifying at least one RFID tag that is cross read in at least one location of a facility, said reader comprising
   a normalizing engine configured for
      obtaining information on at least one parameter from one or more RFID tags in said facility through scanning the location, wherein said scanning is performed on at least one of an asset tag and a location tag, wherein said asset tag comprises information about an asset of said RFID tag and said location tag comprises information about said location of said RFID tag, and
      normalizing said obtained parameter information for each detected RFID tag at said location scanned, wherein said normalizing is performed based on a predefined normalization index, wherein said predefined normalization index is formulated based on at least one of type of said RFID tag and type of asset said RFID tag is pasted on, and said normalized parameter information is used to identify a plurality of neighboring assets;
   a neighboring asset engine configured for formulating at least one set of neighboring assets, wherein a cluster of said plurality of neighboring assets is formulated based on said normalized parameters;
   an adjacent location engine configured for formulating spatial location maps of neighboring locations, wherein at least location pair analysis is performed by said location engine to identify said at least one cross read and wherein said neighboring locations are scanned to co-relate one or more metrics, wherein said scanning is performed to analyse one or more sequences and scan times of said location being scanned over a period of time for detecting said at least one cross read;
   a cross read identification engine configured for performing analysis and categorizing one or more cross reads;
   an inventory reconciliation engine configured for performing comparison between at least one of a prior inventory scan and a present scan output and a present scan output to provide information about at least one of a new, found and missing items;
   a reporting engine configured to display a result of reconciled data to a user after performing said comparison; and
   a cross read filter configured to eliminate said at least one cross read after said scanning of the location wherein said cross read identified, said plurality of neighboring assets identified, and said adjacent location map formulated is stored in a database as historical information, wherein said historical information is used to identify said at least one cross read in at least one subsequent scan, wherein said tag is one of an active tag and a passive tag, and wherein said tag is the active tag if a power source of said RFID tag is located internally and said tag is the passive tag, if a power source of said RFID tag is from energy transferred using radio frequency from said RFID reader.

14. The system as in claim 7, wherein normalizing said obtained parameter information in said system comprises of at least one means for:
   fetching scanned data to obtain at least one normalized parameter;
   analyzing a transaction cycle within a location scan wherein said transaction cycle is dissected;
   creating a master database using said obtained parameter information; and
   creating at least one normalization index comprising of at least one predefined value based on said parameter information, wherein the predefined value of said parameter information corresponds to the type of asset to which said detected RFID tag is attached to and the characteristics of said RFID tag of a respective model and a vendor of said detected RFID tag;
   forming said at least one normalized parameter based on said at least one normalizing index; and
   calculating at least one of average normalized signal strength for said RFID tag based on said at least one normalized parameter to identify at least one neighboring asset set.

15. The RFID reader as claimed in claim 13, further comprising a plurality of engines for scanning a plurality of inventories, wherein said plurality of inventories comprise of one or more tags.

16. The RFID reader as claimed in claim 13, wherein said RFID reader receives information sent by a plurality of transponders using an antenna, wherein said scanned data is analyzed.

17. The RFID reader as claimed in claim 13, wherein said reader identifies one or more cross read tags based on average Received Signal Strength Indication (RSSI) value for each tag and highest and lowest RSSI value for each said tag.

18. The neighboring asset engine as claimed in claim 13, wherein said neighboring asset engine scans a plurality of inventories to determine one or more neighboring inventories.

19. The adjacent location engine as claimed in claim 13, wherein said adjacent location engine determines when an asset is cross read.

20. The normalizing engine as claimed in claim 13, wherein said normalizing engine creates a master database and a normalization index, wherein said master database comprises of a plurality of parameters and said normalization index is configured to be used as a look up table.

* * * * *